United States Patent [19]

Maggs et al.

[11] 3,867,217

[45] Feb. 18, 1975

[54] METHODS FOR MAKING ELECTRONIC CIRCUITS

[75] Inventors: Charles Maggs, Florham Park; Walter Werner Weick, Somerville, both of N.J.

[73] Assignee: Bell Telephone Laboratories, Incorporated, Murray Hill, N.J.

[22] Filed: Oct. 29, 1973

[21] Appl. No.: 410,619

[52] U.S. Cl. .......................... 156/3, 156/13, 156/18
[51] Int. Cl. .......................................... C23f 1/02
[58] Field of Search ............ 174/68.5; 29/578, 580, 29/583, 625; 156/3, 7, 13, 18, 345; 252/79.2; 134/7

[56] References Cited

UNITED STATES PATENTS 3,258,898 7/1966 Garibotti ............................ 156/7 X
3,668,028 6/1972 Short .................................... 156/3

*Primary Examiner*—William A. Powell
*Attorney, Agent, or Firm*—R. B. Anderson

[57] ABSTRACT

In a technique for forming thin-film circuits by laser machining, the gold conductor layer is first covered with a copper protective layer. After machining, the laser-machined gaps are cleaned by a fluid stream containing abrasive particles, during which operation the protective layer shields the gold conductors. Thereafter, the protective layer is removed by selective etching.

10 Claims, 3 Drawing Figures

METHODS FOR MAKING ELECTRONIC CIRCUITS

BACKGROUND OF THE INVENTION

This invention relates to laser machining methods, and more particularly, to methods for forming electronic circuit patterns on insulative substrates.

The patent of M. I. Cohen, W. W. Weick and J W West, U.S. Pat. No. 3,622,742, assigned to Bell Telephone Laboratories, Incorporated, describes a method for using laser machining to form thin-film circuits on ceramic substrates. A plurality of ceramic substrates coated with gold are mounted on the outer periphery of a rotating drum. As the drum rotates, a pulsed laser focused on the gold surface evaporates successive gaps or spots in the metal which are properly overlapped so that relatively large areas of the metal can be removed to define the desired circuit pattern. For some purposes this technique is preferable to conventional photolithographic masking and etching because the pulsed laser can be controlled by a computer program; the desired circuit can therefore be designed merely by manipulating the computer program.

Laser machining inevitably results in an accumulation of debris in the gaps between the metal conductors left intact. To give dependable insulation between the thin-film conductors, it is important that the gaps be cleaned; but is has been found that cleaning in baths of gold etchant such as aque regia or ceramic etchant such as phosphoric acid are insufficient of themselves to give dependable cleaning. It has further been found that erosion of the gaps by a fluid stream containing abrasive particles will give dependable cleaning, particularly if used in conjunction with a mild ceramic etchant such as phosphoric acid. Unfortunately, such abrasive particles invariably contaminate the conductors, thereby introducing nonuniformities in conductor conductivity and reducing the dependability with which they can be bonded to other conductors.

SUMMARY OF THE INVENTION

Accordingly, it is an object of this invention to give dependable cleaning of laser-machined gaps in thin-film circuits without contaminating the circuit conductors.

This and other objects of the invention are attained in an illustrative embodiment thereof comprising the step of covering the gold conductor layer with a thin layer of copper prior to laser machining. The devices are then machined in the usual manner with gaps being cut through both the copper and gold layers. Next, the laser-machined gaps are cleaned in the optimum manner by a high pressure fluid stream, such as air, containing abrasive particles. The abrasive particles erode part of the copper layer, but the layer is of sufficient thickness, for example, 2 to 4 microns, that the abrasive particles do not penetrate through it to contaminate the gold layer. Thereafter, the copper protective layer is removed by a selective metal etch to leave only the gold circuit pattern on the ceramic substrate. The gold conductors are of course uncontaminated, and as such, their conductivities are uniform and they are capable of being bonded in a conventional manner to other conductors.

These and other objects, features and advantages of the invention will be better understood from a consideration of the following detailed description taken in conjunction with the accompanying drawing.

DRAWING DESCRIPTION

DETAILED DESCRIPTION

Figure 1:
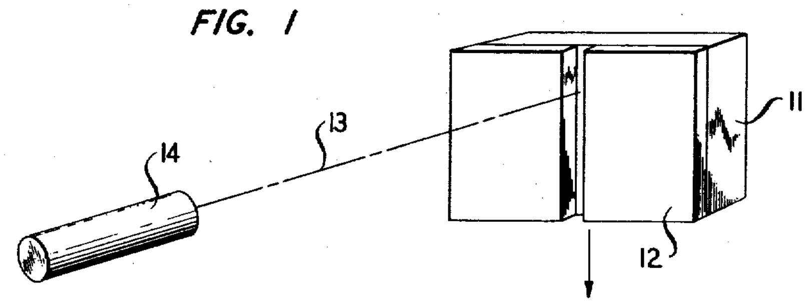
FIG. 1 shows schematically apparatus for laser machining thin-film circuits.

Referring now to FIG. 1 there is shown schematically apparatus for laser machining thin-film circuits in a manner described in more detail in the aforementioned Cohen et al. patent. A ceramic substrate 11 having on one surface a conductive film 12 such as gold is periodically driven through the path of a focused laser beam 13 projected by a laser 14. As the substrate moves through the laser beam path, the laser is pulsed periodically to evaporate portions of the conductive film 12. The laser beam is preferably switched on and off by a train of digital signals representing the electronic circuit pattern to be machined on the substrate. Areas to be evaporated are defined by overlapping laser spots, each determined by one bit of digital information. As described in the patent, a plurality of substrates 11 are preferably mounted on the periphery of a drum which drives them successively through the laser beam path. After selective evaporation, the portions of the conductive film 12 left intact constitute conductors of the fabricated electronic circuit.

After the circuit has been formed it is important that the exposed areas of the substrate surface be thoroughly cleaned of all debris so that the various conductors left intact are dependably insulated. As mentioned before, cleaning with a fluid stream of abrasive particles tends undesirably to contaminate the thin-film conductors.

Figure 2:
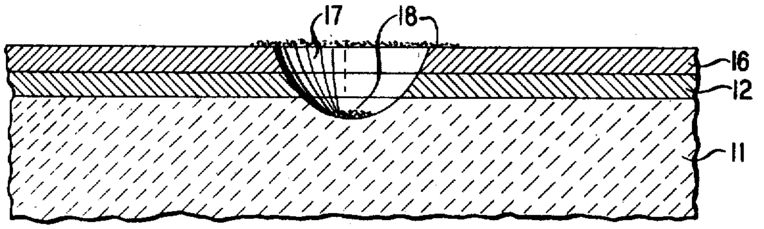
FIG. 2 is a schematic sectional view of part of a thin-film circuit device made in accordance with one step of an illustrative embodiment of the invention.

Referring to FIG. 2, such contamination is prevented in accordance with the invention by forming a protective layer 16 over the conductive layer 12 prior to laser machining. As is known, the conductive layer 12 is typically of gold, with palladium and titanium intermediate layers, and having a total thickness of about 2 microns. The protective layer 16 is preferably a copper layer having a thickness of 2 to 4 microns which may be formed either by electroplating or vacuum deposition as are known.

Figure 3:
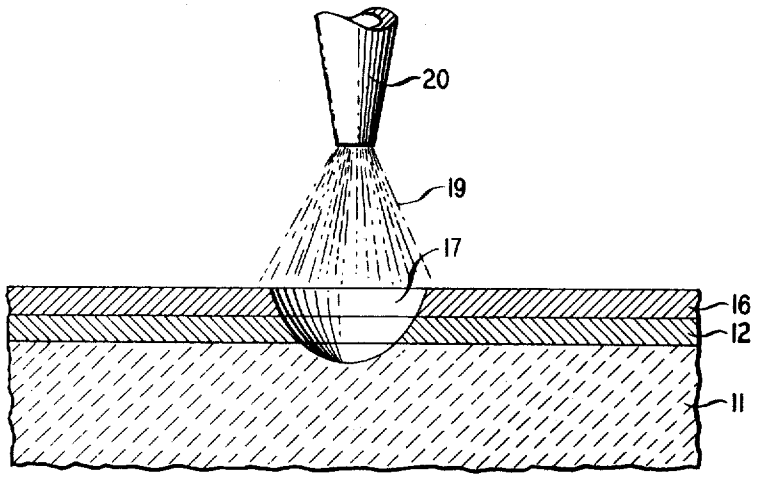
FIG. 3 is a view of the thin-film device of FIG. 1 illustrating another step of the invention.

When the substrate 11 is exposed to the laser beam as shown in FIG. 1, the beam may typically form a gap 17 in the layers 16 and 12 by evaporation as described before. This evaporation in turn may typically leave deposits of debris 18 which of course should be removed before the circuit is put into use. Referring to FIG. 3, the debris is removed by subjecting it to a high pressure fluid stream 19 containing small abrasive particles projected from a nozzle 20. For example, the fluid stream may contain particles of aluminum oxide having diameters in the range of 10–27 microns carried by air projected at a pressure of 60 pounds per square inch. For this purpose a commercially available abrasive cleaning machine known as AIRBRASIVE®, commercially available from the S.S. White Company (Division of Pennwalt Corporation), Piscataway, N.J., may be used. Alternatively, abrasive particles in a liquid carrier may be used as is known in the art.

The abrasive fluid stream of course cleans the gap 17 of all debris by erosion. Part of the protective layer 16 is eroded, but the 2 to 4 micron thickness of copper has been found to be sufficient to prevent any penetration of abrasive particles to the conductive layer 12. After cleaning, the protective layer 16 is removed by selective etching in a solution that does not affect the gold layer 12 or the ceramic substrate 11, as for example, a known solution of ferric chloride ($FeCl_3$). Removal of the protective layer leaves the finished thin-film circuit defined by the remaining portion of conductive layer 12, which is uncontaminated by the processing, and as such is of uniform conductivity and may readily be bonded in a known manner to other conductors.

It has been found that the protective layer 16 does not interfere with laser machining. Indeed, when using a neodymium-YAG laser projecting beam having a wavelength of 1.06 microns, it was found that the copper absorbed radiation with greater efficiency than uncoated gold, resulting in a slight decrease in the laser power required for effective machining. The ceramic substrate 11 is preferably of aluminum oxide, and, prior to abrasive cleaning, exposure to a boiling 70 percent solution of phosphoric acid has been found to be advantageous, but not essential.

Referring again to FIG. 2, microscopic examination of the substrate 11 has shown that the gap 17 may typically extend 2.8 microns below the substrate surface. Exposure of the gap to abrasive cleaning for 30 seconds increases the depth of the gap by 2 microns through debris erosion and removal. Abrasive cleaning for an additional 30 seconds increased the depth by an additional 0.3 microns, and a further 30-second exposure produced no measurable increase in depth. A 2-micron thick layer of copper was found to withstand 30 seconds of abrading as described above and can therefore be considered as being feasible, although other abrasion fluids may require a slightly thicker protective layer. Tests showed that after 30 seconds of abrasive cleaning and the other processing in accordance with the invention, the leakage resistance between any two conductors exceeded $10^{12}$ ohms at 100 volts, and the gold film conductivity was the same as for unprocessed gold. Tests further showed that the processed gold conductors 12 could be bonded with the same reliability as unprocessed gold, whereas gold that has been contaminated by abrasive particles is often incapable of dependable and consistent bonding.

While the foregoing is considered to be fully adequate in defining the invention, the following sequence of processing steps is given to illustrate a typical complete production process for thin-film circuits in accordance with the invention:

1. Laser scribe 3.75 inch by 4.50 inch metallized ceramic wafers on the back side.
2. Copper plate at 5 mA per square centimeter for 9 minutes in a cyanide bath to give a 2-micron thick protective layer.
3. Break the wafer into approximately 1-inch wide segments.
4. Laser machine the conductor patterns.
5. Remove loose debris with a solvent spray.
6. Immerse for 1 minute in boiling 70 percent $H_3PO_4$.
7. Rinse and solvent spray
8. Abrasive clean.
9. Rinse and solvent spray.
10. Etch for 10 seconds, $FeCl_3$ (1 molal).
11. Rinse and solvent spray.
12. Etch for 1 minute, $FeCl_3$ (1 molal).
13. Rinse and solvent spray.

The foregoing is intended to be merely illustrative of the inventive concepts involved. Plainly, other metals could be used for the protective coating, but in choosing such metals care should be taken to avoid materials that might, either directly or through selective etching, contaminate the circuit conductors or substrate. Further, any such metal should be sufficiently resistant to the abrasive stream and should be sufficiently absorptive of laser light to be suitable for laser machining; in this connection, various copper-rich alloys may be suitable. Various other embodiments and modifications may be made by those skilled in the art without departing from the spirit and scope of the invention.

What is claimed is:

1. In a method for making electronic circuits, the improvement comprising the steps of forming a first metal layer on a surface of a substrate;

forming a second metal layer over the first layer, the second layer being of a different metal from that of the first layer;

defining a circuit comprising the step of evaporating with a laser beam a portion of the first and second layers thereby to expose at least one area of the substrate surface;

cleaning the exposed substrate surface area comprising the step of directing a fluid stream containing abrasive particles against the second layer and said area, the fluid stream being sufficiently abrasive to clean the substrate surface area and to erode part of the second layer, but not sufficiently abrasive to penetrate through the second layer.

and selectively dissolving the second layer by exposing it to a metal etchant which does not significantly affect the metal of the first layer

2. The improvement of claim 1 wherein:

the second layer is a copper layer.

3. The improvement of claim 2 wherein.

the substrate is a ceramic substrate.

4. The improvement of claim 3 wherein:

the first layer is a gold layer.

5. The improvement of claim 4 wherein:

the step of forming the second layer comprises the step of depositing copper to a thickness on the order of 2 to 4 microns.

6. The improvement of claim 5 wherein:

the abrasive particles are aluminum oxide particles having diameters in the approximate range of 10 to 27 microns.

7. The improvement of claim 6 wherein:

the defining step comprises the step of removing a plurality of portions of metal;

each portion being defined by a plurality of overlapping laser machined spots.

8. The improvement of claim 7 wherein:

the step of laser machining comprises the step of projecting a light beam having a wavelength on the order of 1.06 microns from a neodymium-YAG laser.

9. The improvement of claim 8 further comprising the step of:

immersing the substrate surface in a phosphoric acid solution for about one minute prior to the removal of the second layer.

10. The improvement of claim 9 wherein:

the metal etchant is a solution of ferric chloride.

* * * * *